United States Patent Office 3,553,050
Patented Jan. 5, 1971

3,553,050
PROMOTING THE ADHESION OF HALOGEN-CONTAINING RESINS TO TEXTILES
James D. Harris, Macclesfield, and Colin D. Ashurst, Hale Barns, England, assignors to Hardman & Helden Limited, Lancaster, England, a British company
No Drawing. Filed June 2, 1969, Ser. No. 829,756
Claims priority, application Great Britain, June 7, 1968, 27,284/68
Int. Cl. C09j 5/06
U.S. Cl. 156—306                      9 Claims

ABSTRACT OF THE DISCLOSURE

The adhesion of halogen-containing vinyl resins to synthetic and glass fibre textiles is promoted by incorporation in the said resin of a polyhydric phenol and hexamethylene tetramine.

---

This invention relates to promoting the adhesion of halogen-containing vinyl resins to synthetic textile materials and glass-fibre textile materials. The term "halogen-containing vinyl resin" is used herein to refer to polyvinyl chloride, polyvinylidene chloride, and the copolymers of vinyl chloride and vinylidene chloride containing a major proportion of units of vinyl chloride and/or vinylidene chloride.

Halogen-containing vinyl resins such as polyvinyl chloride when applied, e.g., as plastisols, powders or sheets, to synthetic textile fibres, e.g. of polyhexamethylene adipamide, polycaprolactam or polyethylene terephthalate, or glass-fibre textile materials and subsequently gelled, sintered or fused by the application of heat and pressure have been found not to adhere satisfactorily to the fibres. Bond strength is low and to improve adhesion it has been proposed to incorporate into the synthetic fibres some natural fibre, e.g. of cotton, to which the halogen-containing resins adhere strongly. This replacement of some of the synthetic fibres by natural fibres can cause a loss of strength in the finished product which is undesirable, particularly when the finished product is to be used in the construction of, e.g., conveyor belts.

Attempts have been made to improve adhesion of halogen-containing vinyl resins to synthetic fibres so as to avoid the incorporation of natural fibres into the textile. One method which has been proposed is the addition to the resin of a small quantity of an organic isocyanate. This procedure does improve adhesion but suffers from the disadvantage of being both expensive and undesirable since organic isocyanates are well known to present health hazards to people who handle them.

The present invention provides a method whereby halogen-containing vinyl resins may be firmly bonded to synthetic textile materials and glass-fibre textile materials. According to the invention, halogen-containing vinyl resins are bonded to synthetic textile materials and glass-fibre textile materials by applying a mixture of said resin with a polyhydric phenol and haxamethylene tetramine to the said synthetic or glass fibre textile material, and gelling, sintering or fusing the said mixture by the application of heat alone, or heat and pressure. Thus, it has been found that by incorporating into, e.g., polyvinyl chloride, a polyhydric phenol, such as resorcinol, pyrogallol, or catechol, together with hexamethylene tetramine, greatly improved adhesion of the polyvinyl chloride to synthetic textile fibres, and glass fibres, such as those already mentioned, is obtained. The mixture containing the resin is spread on, or otherwise applied to, the fibres and gelled, sintered or fused by the application of heat alone, or heat and pressure. Conventional temperatures and pressures for the halogen-containing vinyl resin are used, e.g. ¼ to 10 tons per sq. in. (40 to 1600 kg./cm.$^2$) at 140° to 200° C. The resin adheres strongly to the fibres and the mechanical and physical properties of the resin are not reduced. Stabilisers, plasticisers, fillers and other conventional additives may also be incorporated in the resin if desired.

The weight ratio of polyhydric phenol and hexamethylene tetramine to the halogen-containing resin may vary widely, e.g. from 2 to 10, preferably 2 to 5, parts by weight of the phenol and 1 to 6, preferably 1 to 3, parts by weight of hexamethylenetetramine for each 100 parts by weight of the halogen-containing vinyl resin. Preferably the weight ratio of the phenol to hexamethylene tetramine is 1.5:1 to 2.5:1.

It is sometimes difficult to disperse a polyhydric phenol either with or without hexamethylene tetramine into a halogen-containing vinyl resin. This difficulty may however be overcome by first mixing 100 parts by weight of the polyhydric phenol with from 10 to 250 parts, preferably 75 to 125 parts, by weight of finely divided silica or a silicate. Preferably both the polyhydric phenol and silica or silicate should be finely divided prior to admixture with the resin. The polyhydric phenol may also be incorporated in the resin as a solution in a suitable solvent compatible with the resin. Hexamethylene tetramine may also prove difficult to disperse in this case, a finely ground material containing a lubricant, e.g. silica or zinc stearate, may be used. The polyhydric phenol and hexamethylene tetramine can also be dispersed in a plasticiser for the halogen-containing resin and ground prior to use.

While the invention is especially useful in connection with polyvinyl chloride it can also be used with other halogen-containing vinyl resins especially other thermoplastic vinyl resins such as polyvinylidene chloride and copolymers of vinyl chloride and vinyl acetate.

The invention may be illustrated by the following examples.

EXAMPLE 1

A typical polyvinyl chloride (P.V.C.) plastisol formulation was used having the following composition:

| | Parts by weight |
|---|---|
| Paste Grade polyvinyl chloride resin (sold under the name "Breon 121") | 100 |
| Di-Alphanol phthalate plasticiser [1] | 20 |
| Trixylyl phosphate | 80 |
| Calcium/zinc stabiliser | 3 |

[1] Alphanol is a commercially available mixture of mainly normal and 2-methyl alcohols having 7, 8 and 9 carbon atoms in the ratio $C_7 : C_8 : C_9 :: 40 : 43 : 17$.

A blend was prepared of 3.75 parts by weight of resorcinol and 3.75 parts by weight of silica (the blend is commercially available under the name "Cofill 11"), and 2.25 parts by weight of finely divided hexamethylene tetramine (e.g. Hexamine SL, a commercial product of the Walker Chemical Co. Ltd.). This blend was premixed with part of the phthalate plasticiser and then mixed, using a Kenwood mixer, with the "Breon 121," the remaining plasticiser, and the stabiliser to form a plastisol mix.

Adhesion test samples were prepared in a mould 6" by 1" (15.2 x 2.5 cm.) x 0.25" (6.35 mm.) thick. The mould base was protected by regenerated cellulose film on which was placed a strip of the synthetic fabric to be tested. Half the fabric was covered by a second piece of the film and the mould cavity was placed over it. The plastisol was then poured into the mould and on top of the filled cavity was placed another piece of regenerated cellulose film and the mould lid. The regenerated cellulose film was used to avoid adhesion of the P.V.C. to the mould surface. The whole assembly was placed in a steam heated press and gelled under a pressure of 1 ton per sq. inch (157.5 kg./cm.²) at 164° C. for 15 minutes. After cooling, the samples were removed from the mould and the force required to peel the P.V.C. from the fabric was determined. Tests were made with polyhexamethylene adipamide (nylon) and polyethylene terephthalate ("Terylene") belting fabrics and the results are given in the following table.

| Results | Peel strength (lb./in.) | | | |
|---|---|---|---|---|
| | Nylon | | Terylene | |
| | Lb./in. | Kg./cm. | Lb./in. | Kg./cm |
| P.V.C. sample without resorcinol silica, and hexamethylene tetramine | 4 | 7.14 | 12 | 21.4 |
| P.V.C. sample with resorcinol, silica and hexamethylene tetramine | 60 | 107 | 49 | 87.5 |

The addition of finely ground resorcinol, silica and formaldehyde donor (hexamethylene tetramine) thus gave a considerable improvement in the adhesion of the P.V.C. to the polyamide and polyester fabrics.

EXAMPLE 2

Resorcinol, catechol or pyrogallol was preground to a fine powder with a silica (Manosil VN3) in the weight ratio 1:1. Dispersions of the phenol, silica and hexamethylene tetramine were made in a plasticiser (trixylyl phosphate), together with a small proportion of Ca/Zn stabiliser (Manomet 105), which was ground by passing through a triple roll mill. The compositions of the three dispersions were as follows:

| | A | B | C |
|---|---|---|---|
| Resorcinol | 37.5 | | |
| Catechol | | 37.5 | |
| Pyrogallol | | | 32.7 |
| Silica | 37.5 | 37.5 | 32.7 |
| Trixylyl phosphate | 140 | 140 | 140 |
| Manomet 105 | 3 | 3 | 3 |
| Hexamethylene tetramine | 22.5 | 22.5 | 22.5 |

The dispersions A, B and C were incorporated into three P.V.C. pastes to give the following formulations.

| Paste | 1 | 2 | 3 |
|---|---|---|---|
| P.V.C. paste polymer ("Corvic" P65/54) | 100 | 100 | 100 |
| Trixylyl phosphate | 80 | 80 | 80 |
| Dialphanyl phthalate | 20 | 20 | 20 |
| Resorcinol | 3.75 | | |
| Silica | 3.75 | 3.75 | 3.27 |
| Manomet 105 | 3 | 3 | 3 |
| Catechol | | 3.75 | |
| Pyrogallol | | | 3.27 |

Adhesion test samples were prepared as in Example 1, test being made with the following fabrics:

(1) Nylon (i.e. polyhexamethylene adipamide) 1/840d 1/840d.
(2) Nylon fabric 2/840d doubled with 4/7s cotton.
(3) Rayon 2/4/1650d warp-nylon weft 3/840d fabric.
(4) "Terylene" 5/1000d warp/4/840d weft nylon fabric.

The three pastes were compared with a paste No. 4, identical to the others but containing no phenol or hexamethylene tetramine. Test specimens were gelled for 15 minutes at 166° C. at a mould pressure of 1 ton/in.² (157.5 kg./cm.²).

RESULTS

| Fabric | Paste | | | | | | | |
|---|---|---|---|---|---|---|---|---|
| | 1 | | 2 | | 3 | | 4 | |
| | Peel Strength | | | | | | | |
| | Lb./in. | Kg./cm. | Lb./in. | Kg./cm. | Lb./in. | Kg./cm. | Lb./in. | Kg./cm. |
| Nylon 1/840d/1/840d | 60 | 107 | 17 | 30.3 | 26 | 46.4 | 5 | 8.9 |
| Nylon 2/840d/cotton 14/7s | ¹80 | ¹143 | ¹70 | ¹125 | 58 | 103.6 | 22 | 39.3 |
| Rayon 2/4/1650d/nylon 3/840d | ¹66 | ¹118 | ¹69 | ¹123 | 36 | 64.3 | 26 | 46.4 |
| Terylene 5/1000d nylon 4/840d | 20 | 35.7 | | | 18 | 32.1 | 6 | 10.7 |

¹ P.V.C. failed.

Catechol and pyrogallol gave better results than with no phenol present, but the results were somewhat lower than with resorcinol in most cases.

EXAMPLE 3

An emulsion copolymer based on 90% vinyl chloride and 10% vinyl acetate was tested. This copolymer is sold commercially as Vinnol E/10/65P.

A dispersion of resorcinol, silica and hexamethylene tetramine was prepared as in Example 2 and incorporated into the following formulation.

Formulation: Parts by weight
"Vinnol E/10/65P" _____ 100
Trixylyl phosphate _____ 80
Dialphanyl phthalate _____ 20
Resorcinol _____ 3.75
Silica _____ 3.75
Hexamethylene tetramine _____ 2.25
Manomet 105 _____ 3

This plastisol was tested on the all nylon (polyhexamethylene adipamide) fabric used in the previous examples in comparison with a plastisol containing no resorcinol, silica or hexamethylene tetramine. Samples were gelled in the mould for 15 minutes at 165° C. under a pressure of 1 ton/in.² (157.5 kg./cm.²).

RESULTS

| | Peel strength | |
|---|---|---|
| | Lb./in. | Kg./cm. |
| Paste with resorcinol, silica and hexamethylene tetramine | 54 | 96.4 |
| Paste with no additives | 6 | 10.7 |

EXAMPLE 4

The following formulation was applied to a loose woven glass fibre fabric, and moulded 15 minutes at 165° C., under 1 ton/in.² (157.5 kg./cm.²) pressure.

Parts by weight
"Breon 121" _____ 100
Trixylyl phosphate _____ 80
Dialphanyl phthalate _____ 20
Resorcinol _____ 3.75
Silica _____ 3.75
Hexamethylene tetramine _____ 2.25
Manomet 105 _____ 3

The results compared with those obtained using a paste containing no resorcinol, silica, or hexamethylene tetramine were as follows:

| | Peel strength | |
|---|---|---|
| | Lb./in. | Kg./cm. |
| Paste with resorcinol, silica and heaxmethylene tetramine | 22.0 | 39.3 |
| Paste with no additives | 12.0 | 21.4 |

EXAMPLE 5

Resorcinol was pre-ground with silica in the ratio 1:1 and a dispersion of the resorcinol, silica and hexamethylene tetramine made as in Example 2.

Dispersion formulation: Parts by weight
- Resorcinol _____ 37.5
- Silica _____ 37.5
- Trixylyl phosphate _____ 140
- Manomet 105 _____ 3
- Hexamethylene tetramine _____ 22.5

This dispersion was added to a plastisol to give the following formulation.

Parts by weight
- Corvic P65/54 _____ 100
- Trixylyl phosphate _____ 80
- Dialphanyl phthalate _____ 20
- Resorcinol _____ 1.66
- Hexamethylene tetramine _____ 1
- Silica _____ 1.66
- Manomet 105 _____ 3

The plastisol was tested on the all-nylon (polyhexamethylene adipamide) fabric as before, samples being gelled in the mould for 15 minutes at 165° C., under a pressure of 1 ton/in.² (157.5 kg./cm.²). A peel strength of 50 lb./in (89.3 kg./cm.) was obtained.

EXAMPLE 6

Resorcinol and hexamethylene tetramine were tested in a P.V.C. plastisol without silica. A dispersion was first made of the resorcinol and hexamethylene tetramine in plasticiser.

Dispersion formulation: Parts by weight
- Resorcinol _____ 25
- Hexamethylene tetramine _____ 15
- Trixylyl phosphate _____ 57
- Manomet 105 _____ 3

The dispersion was added to two P.V.C. plastisols to give two different concentrations of resorcinol and hexamethylene tetramine.

| Plastisol formulations | A | B |
|---|---|---|
| Corvic P65/54 | 100 | 100 |
| Trixylyl phosphate | 80 | 80 |
| Dialphanyl phthalate | 20 | 20 |
| Resorcinol | 3.75 | 10 |
| Hexamethylene tetramine | 2.25 | 6 |
| Manomet 105 | 3 | 3 |

The plastisols were tested on the all nylon fabric as before, sample being gelled in the mould for 15 minutes at 165° C., under a pressure of 1 ton/in.² (157.5 kg./cm.²).

RESULTS

| | Peel strength | |
|---|---|---|
| | Lb./in. | Kg./cm. |
| Plastisol: | | |
| A | 32 | 57.1 |
| B | 34 | 60.7 |

We claim:
1. Process for bonding a halogen-containing vinyl resin selected from the class consisting of polyvinyl chloride, polyvinylidene chloride and their copolymers containing a major proportion of units of vinyl chloride, vinylidene chloride, or mixtures thereof, to a synthetic textile material, or to glass fibre textile material, which comprises spreading a mixture of the said resin with a polyhydric phenol and hexamethylene tetramine onto said synthetic or glass fibre textile material, and heating said mixture, or heating said mixture under pressure.

2. Process according to claim 1 in which the polyhydric phenol is resorcinol, pyrogallol, or catechol.

3. Process according to claim 1 in which the polyhydric phenol is used in admixture with 10 to 250 parts, per 100 parts by weight of the polyhydric phenol, of finely divided silica or a silicate.

4. Process according to claim 3 in which 75 to 125 parts, per 100 parts by weight of the polyhydric phenol, of the silica or silicate are used.

5. Process according to claim 1 in which 2 to 10 parts by weight of the polyhydric phenol and 1 to 6 parts by weight of the hexamethylene tetramine are used per 100 parts by weight of the halogen-containing vinyl resin.

6. Process according to claim 5 in which 2 to 5 parts of the phenol and 1 to 3 parts of the hexamethylene tetramine, per 100 parts by weight of the vinyl resin, are used and the weight ratio of the phenol to the hexamethylene tetramine is 1.5:1 to 2.5:1.

7. Process according to claim 1 in which the synthetic textile material is of polyhexamethylene adipamide, polycaprolactam, or polyethylene terephthalate.

8. Process for producing a fibrous mat comprising spreading a mixture containing a quantity of a halogen containing vinyl resin selected from the group consisting of polyvinyl chloride, polyvinylidene chloride and their copolymers containing a major proportion of units of vinyl chloride, vinylidene chloride, or mixtures thereof, a quantity of a polyhydric alcohol and a quantity of hexamethylene tetramine, onto a fabric selected from the group consisting of synthetic resin fabrics and fibre glass fabrics; then heating the fabric having the applied material.

9. The process of claim 8 wherein the process includes compressing during heating step.

References Cited

UNITED STATES PATENTS

| 2,823,156 | 2/1958 | Hedges | 156—333X |
| 2,835,620 | 5/1958 | Bartlett et al. | 156—333X |
| 3,067,085 | 12/1962 | Limperos | 156—333X |
| 3,274,136 | 9/1966 | Glesner et al. | 156—333X |

BENJAMIN R. PADGETT, Primary Examiner

S. J. LECHERT, Jr., Assistant Examiner

U.S. Cl. X.R.

117—126, 138.8, 161; 156—297; 161—92, 93

UNITED STATES PATENT OFFICE
CERTIFICATE OF CORRECTION

Patent No. 3,553,050                      Dated January 5, 1971

Inventor(s) James D. Harris and Colin D. Ashurst

It is certified that error appears in the above-identified patent and that said Letters Patent are hereby corrected as shown below:

Assignee's name should read:  Hardman & Holden Limited

Signed and sealed this 15th day of June 1971.

(SEAL)
Attest:

EDWARD M. FLETCHER, JR.                WILLIAM E. SCHUYLER, JR.
Attesting Officer                      Commissioner of Patents